United States Patent [19]

Williams

[11] 4,030,868

[45] June 21, 1977

[54] FORCE MEASUREMENT AND ANALYSIS PARTICULARLY RELATING TO ROTARY TABLET PRESSES

[75] Inventor: Joseph James Williams, West Caldwell, N.J.

[73] Assignee: Hoffmann-La Roche Inc., Nutley, N.J.

[22] Filed: Mar. 15, 1976

[21] Appl. No.: 666,734

[52] U.S. Cl. .............................. 425/149; 425/261; 425/354; 264/40.4; 264/109

[51] Int. Cl.[2] .......................................... B29C 3/06

[58] Field of Search .......... 425/147, 149, 256, 261, 425/246, 176, 347, 352, 139, 135, 354; 264/40, 109

[56] References Cited

UNITED STATES PATENTS

| | | | |
|---|---|---|---|
| 3,255,716 | 6/1966 | Knoechel et al. | 264/40.4 |
| 3,525,382 | 8/1970 | Devol | 425/137 |
| 3,734,663 | 5/1973 | Holm | 425/149 |
| 3,891,375 | 6/1975 | Pilewski et al. | 425/354 X |

*Primary Examiner*—Robert L. Spicer, Jr.
*Attorney, Agent, or Firm*—Samuel L. Welt; George M. Gould; Mark L. Hopkins

[57] ABSTRACT

There is disclosed instrumentation for use in connection with one or more tablet presses of various types, and in particular rotary tablet presses, for virtually any reasonable combination and number of such tablet presses. Tablet formation information, in particular compression and ejection force information, tablet capping information and force information related to the time of occurrence of punch withdrawal is provided and processed by such instrumentation. This information is selectively applied to converting means which renders the selected information in a convenient data form for processing. Selection of the information may be made for example based on the need or desire to monitor a particular tablet press, tablet press station and/or individual tablet die/punch set combination. The selected information is processed by data processing means to provide output signals, including tablet press control signals, relating for example to the average and standard deviation of a pre-established number of consecutive tabletting events and determination of the frequency and number of abnormal tablet formations. The instrumentation may be employed to determine tabletting characteristics of pharmaceutical tablet granulations. Provision is also made for determining and isolating tablets failing to meet pre-established criteria.

41 Claims, 28 Drawing Figures

INPUT (TP3)
+5V
0V
-5V
+V1
-V2
+V3

INVERTED V AT TP6
+5V
0
COMPARATOR OUTPUT (TP4)
+5V
HYSTERESIS NOT SHOWN
0V

CONVERT COMMAND
CONVERSION START ON FALLING EDGE OF CONVERT COMMAND

PEAK OF 84
+V1

PEAK OF 76
+V2

SUMMATION (TP5)
+10V
+V2
+V1
0V
PEAK DETECTOR RESET (TIME = 10 μSEC MAX)
PUTS 76 INTO PEAK DETECT MODE

A/D STATUS OUTPUT
+5V
0V
RESETS 76
CONVERSION TIME (≈30μSEC)
RESETS 84

PIN 6 OF 88
+5V
0V
(≈10μSEC)
84 IN PEAK DETECT MODE
TIME

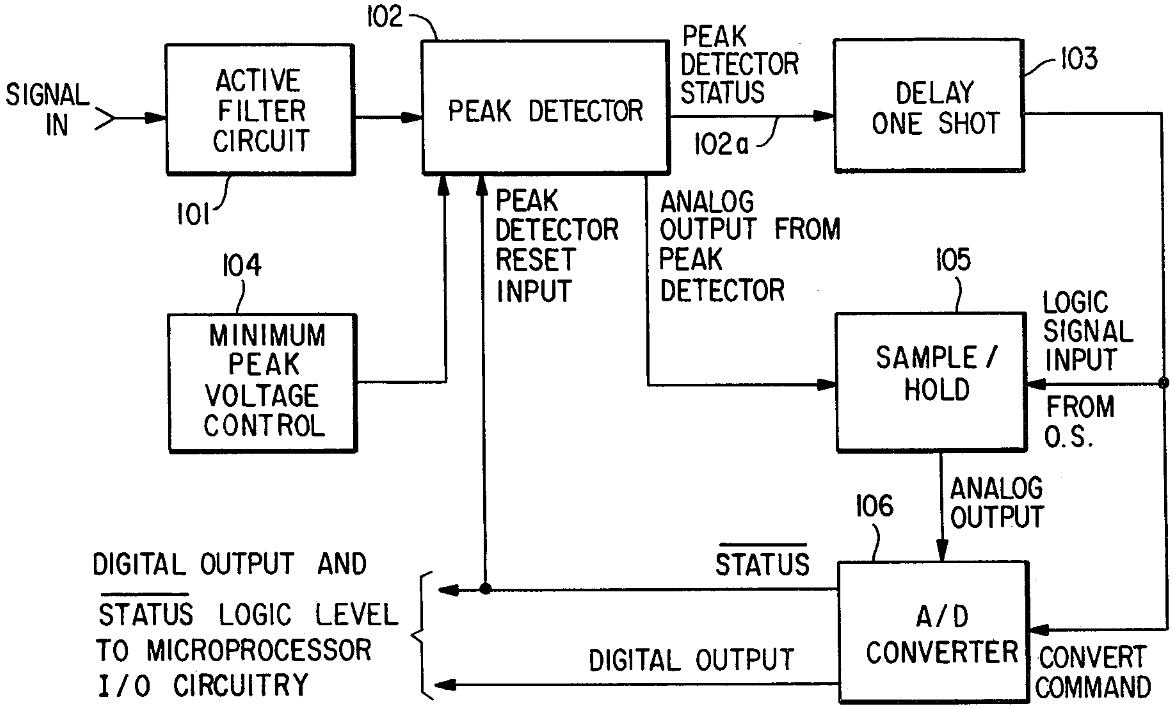
FIG. 12
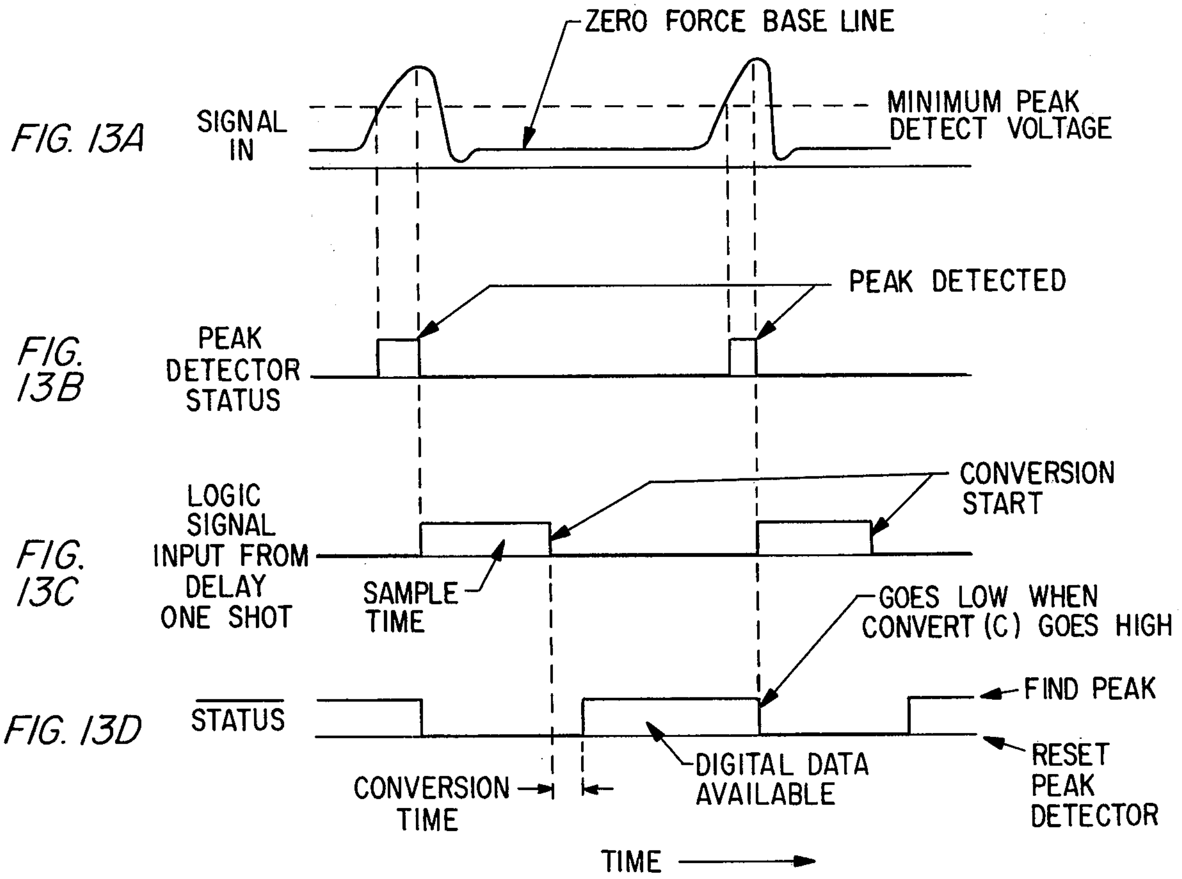

FORCE MEASUREMENT AND ANALYSIS PARTICULARLY RELATING TO ROTARY TABLET PRESSES

CROSS-REFERENCE TO RELATED APPLICATIONS

The subject matter of this application is related to that of co-pending U.S. application Ser. No. 581,459, filed May 28, 1975, and U.S. application Ser. No. 610,706, filed Sept. 5, 1975, the subject matter of which applications, insofar as the same is pertinent to the present application, is incorporated herein by reference.

BACKGROUND OF THE INVENTION

This invention relates to a method and means of determining and processing into convenient form tablet formation force data from tablet presses. The invention provides methods for using these data, for example, to monitor and control the operation of the tablet presses. The developed data are also useful for determining the tabletting characteristics of pharmaceutical tablet granulations. This invention is capable of monitoring and controlling one or more tablet presses and virtually any combination of different tablet presses including: presses having a single die, single punch set and single tabletting (station) location (also known as single die-station presses); presses having multiple dies, multiple punch sets and a single tabletting station (also known as multidie, single station presses); presses havng multiple dies and punch sets and also multiple tabletting locations (also known as multidie-station presses); rotary presses; non-rotary presses; high-speed and low speed presses.

The technology of tablet press instrumentation as a production control tool has been commercialized primarily for rotary multidie-station tablet presses to adjust table weight (for example, U.S. Pat. No. 3,255,716, "Measurement of Forces Within a Tabletting Machine"; and U.S. Pat. No. 3,734,663, "Arming Control for Servo Adjusted Tablet Compression Machines"). Devices of this type have been used to obtain a running average of the peak compression forces developed during tablet compression and to use this value in for example a servo system to control the average compression force.

While this type of device may be thought of as providing an adequate method for maintaining the correct average tablet weight, it does not provide, for instance, a system for determining whether individual tablets are underweight or overweight. Therefore, while the average weight of a batch of tablets produced on, for example, a high-speed rotary tablet machine controlled by such a device may be correct, the deviation in weight between individual tablets may be too great in relation to pre-established criteria for the batch of tablets to be acceptable. Such large deviations in tablet weight, which in most instances are detected only during subsequent Quality Control evaluation of the lot of tablets, may be caused by a poorly operatng tablet press, by defective tooling, by undesirable characteristics of the granulation, etc.

It is clear that it would be desirable to determine the standard deviation or some other measure(s) of irregularity in e.g. tablet weight particularly during the actual tabletting of the granulation. It would also be desirable to have a method for testing if tablets were capping during formation. In some instances, it would also be desirable to provide a method for ejecting from the production lot individual tablets whose weight or compression force characteristics did not fall within certain predetermined limits.

When tablet compression forces and ejection forces measured in connection with data processing systems are used as a development tool in granulation formation, they provide valuable information regarding the tabletting characteristics of the granulation, such as compressibility, lubrication, tendency to laminate or cap, flowability of the material, and tendency to stick or adhere to the punch surfaces following tablet formation.

The compression force and ejection force measurement and data processing systems which are currently used in the development of tabletting granulations have been primarily limited to application on low-speed single die-station (i.e. single die, single punch set, single tabletting location or station) tablet presses. Since many production tablet presses are multidie and multipunch set rotary type machines (with one or more tabletting locations or stations), it would be desirable to fully extend the usefulness of these measurement and data processing systems to rotary, multidie and multiple punch set tablet presses, and particularly to the high-speed rotary tablet presses. Specifically, a tabletting granulation which performs well on a low-speed, single die-station machine or a relatively low speed rotary multidie machine may not perform well on a high-speed multidie, single or multiple station rotary machine because of the reduced time available for cavity filling, compression, and ejection in the higher-speed tabletting machines.

Also, existing systems for monitoring and processing compression forces and ejection forces primarily utilize data processing techniques which restrict their application to low speed (up to 5 tablets/sec.) presses. It would, therefore, be desireable to have a data processing system in which the processing electronics automatically adjust to the entire range of press speeds that could be encountered (presently presses run up to roughly 200 tablets/sec.).

Generally, present force monitoring and processing systems are constructed so that only the data processing functions that are initially built into the units can be performed. No provision is made for changing the data processing procedures if an improved or more desirable data processing sequence is determined. It would be desirable to have the capability for modifying the data processing procedure(s) by, for example, reprogramming the set of instructions in a programmable read-only memory and/or making minor hardware modifications to the data processing unit.

In application where it is not necessary to continuously monitor a tablet press, a single system could be used to monitor several tablet presses on a time-sharing basis. In this application a suitable switching system would be employed to control and record the flow of transducer signal information from the several presses to the data processing unit.

On rotary, multidie, single or multiple station tablet machines it is sometimes desirable to isolate a specific die-punch set combination to determine its tabletting characteristics. A primary purpose of this would be to identify a faulty die-punch set combination or, when applying the system to granulation evaluation, to eliminate the effect(s) of different die-punch set combinations in the comparison of different granulations. This cannot be done within the present art.

SUMMARY OF THE INVENTION

It is, therefore, the principal objective of this invention to provide a method and instrumentation for carrying out the aforementioned desirable aspects and, at the same time, to eliminate or minimize the abovementioned limitations of the prior art. The following are additional objectives of this invention:

To determine (measure)and process the individual tablet compression forces developed in the following kinds and types of tablet presses: rotary; nonrotary; multidie-single station; single die-station; multidie-station; high-speed and low speed tablet presses, and, in particular, for any reasonable number of presses and in any combination of the indicated different kinds and types of presses.

To determine (measure) and process the individual tablet ejection forces developed in the above listed types and kinds of tablet presses, and, in particular for any reasonable number of presses and in any combination of the indicated different kinds and types of presses.

To provide instrumentation for processing compression and ejection forces from one or more tablet presses to obtain objective statistical data for evaluating the quality of operation of the tablet press as well as the characteristics of the tabletting granulation.

To enable the developed objective statistical data to be used to effect ejection from a production batch of individual tablets whose maximum compression force lies outside specified limits.

To provide detection of faulty press operation or poorly flowing granulation through the use of the present standard deviation of compression force as a quantitative measure of performance.

To effect a controlled flow of information from several tabletting machines to a single data processing unit.

To enable the identification and selection of any specific punch set-die combination in a multidie, single or multi-station rotary tabletting machine and processing data from that particular punch set-die combination.

To provide means for determining, at tablet formation speeds, when tablet capping has occurred.

To provide means for detecting instances of force being developed when a punch in being withdrawn from the die.

Included in the broader aspects of this invention, a method and means are provided for evaluating and sorting tablets on a number of tabletting machines according to the forces developed during formation so that only tablets that satisfy predetermined tabletting force criteria are included in the accepted production batch of tablets. The tablets that do not meet the predetermined specifications could be rejected from the production batch.

There is provided a system which automatically adjusts its data acquisition speed to the rate at which the tablets are being formed on the particular press under observation. Moreover, the sytem is such as to enable substantial changes in and to the data processing sequence with an absolute minimum of effort.

The benefits to be derived from this invention are numerous. For example, it would be possible to optimize the formulation of a granulation from a tabletting characteristics standpoint on high-speed multidie, single or multi-station tablet presses which are identical with or which closely simulate the type of high-speed multidie, single or multi-station tablet presses that are commonly used for large volume tablet production. This would minimize the scale-up trials that are required when a new granulation formulation passes from a product development laboratory to a tablet production enviroment.

In a production area, the quality of a batch of tablets can be assessed with greater certainty than could previously be achieved because 100% sampling and processing of the forces developed during tablet formation can be effected. In this way, one can ensure not only that the average tablet weight in a batch is correct but also that the standard deviation in tablet weight, for example, meets required or pre-established standards. Since the statistical determination is carried out from signals derived during the compresson of each tablet (a similar determination may be made from signals derived during the ejection of each tablet), it is possible to detect the formation of faulty tablets in order to prevent them from being mixed with the rest of the production batch. Such a method of sampling and analyzing 100% of the tabletting forces not only will insure a higher qulaity product but also will reduce the cost of tablet production through a decrease in the number of tablet batches which must be rejected because the percentage of individual tablets outside specified limits is too high.

BRIEF DESCRIPTION OF THE DRAWINGS

The above objects and features, as well as the invention itself, will become better understood with reference to the following detailed description, taken in conjunction with the accompanying drawings, in which:

FIG. 12 is a block diagram illustrating a punch withdrawal force detector circuit which may be associated with the circuitry of FIG. 8;

FIGS. 13A–13D graphically illustrate the operation of the circuitry of FIG. 12.

DESCRIPTION OF THE PREFERRED EMBODIMENT (S)

This invention is broadly comprised of (a) a switching unit for selecting the tablet press from which data are to be processed and (b) an electronic data processing and control unit for processing these data inter alia into parameters which indicate the quality of tablets which are being produced. The electronic data processing and control unit also develops control signals which may be used to affect the operation of the tablet press.

Figure 1:
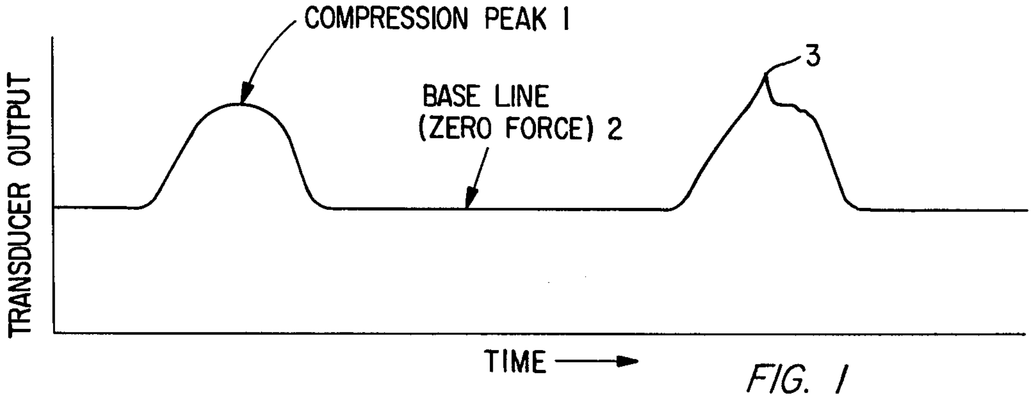
FIG. 1 is a graphic illustration of the output of a force-sensing transducer vs time for a tablet press with dwell time between tablet compressions and showing in particular a force representaton of a tablet considered malformed due, for example, to the occurrence of capping.

FIGS. 1, 2, 3 and 4 illustrate the various types of transducer signals which are encountered from present day tablet presses. The transducer outputs illustrated along the ordinance in these figures represent the voltages which are obtained from piezoelectric force transducers, or from resistive element force transducers, or from other types of force transducers which may be installed on tablet presses. FIG. 1 is a trace of transducer output versus time for a tablet press with dwell time between tablet compressions (such as a RS3 rotary press made by Manesty). The maximum force developed during each tablet compression is indicated by the maximum transducer output developed during each tablet compression and is indicated in FIG. 1 as the compression peak 1. During the dwell time (between tablet compressions), there is virtually no force on the tablet press punches; this is referred to as the baseline 2 in FIG. 1. Also indicated in this figure is a sharp peak 3 which is representative of tablet capping or some other abnormality during the tablet compression cycle. A simplified method for detecting the presence of such a peak will be described later.

Figure 2:
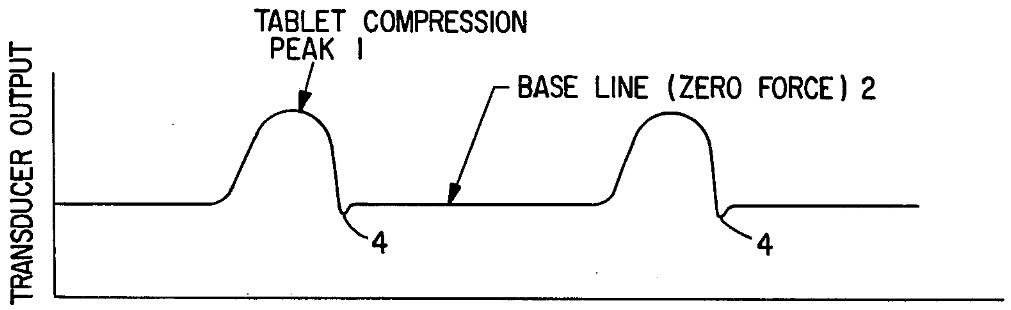
FIG. 2 is a graphic illustration of the output of a force-sensing transducer vs time for a tablet press with dwell time between tablet compressions and showing in particular a negative force representation.

On some tablet presses it is convenient to install the force transducer in such a location that it senses the punch withdrawal force that is developed when it (the punch) is being withdrawn from the tablet die, which may also enable detection of forces caused by the adherence of the tablet to the punch face. This force may be represented in FIG. 2 as the negative-going peak 4. The transducer output versus time trace shown in FIG. 2 is also for a tablet press which has dwell time between tablet compressions and may represent, for example, a Beta-type rotary press made by Manesty. A method and arrangement for determining the magnitude of punch withdrawal force is also described later.

Figure 3:
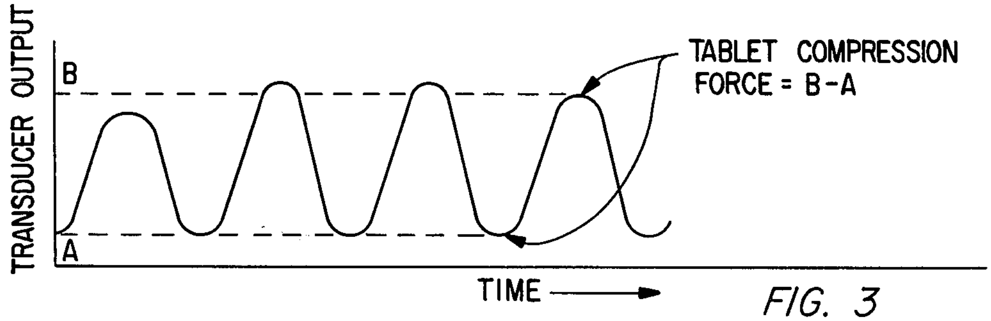
FIG. 3 is a graphic illustration of the output of a force-sensing transducer vs time for a tablet press with negligible dwell time (high-speed press) between tablet compressions.

FIG. 3 indicates a typical transducer output versus time for a tablet press with a negligible dwell time between tablet formations. This condition is usually encountered in high-speed multidie-station rotary tablet presses such as for example the Manesty Mark II Rotopress. With this type of signal, the tablet compression force is determined as the maximum value of the transducer output referenced to the preceding minimum value. In FIG. 3, this is illustrated as the force associated with point B minus the force associated with point A, i.e. B—A, where point or level A is taken as the baseline for that particular tablet formation. FIG. 3 is also illustrative of the characteristics of the transducer signal which is obtained from an instrumented ejection cam on a multidie-station high-speed rotary tablet press. If the trace of FIG. 3 were obtained from a transducer installed on an ejection cam, the ejection force of a specific tablet would be proportional to the difference of force levels (B) and (A). It is clear, therefore, that a system capable of processing compression data of the form shown in FIG. 3 is also capable of processing ejection force data of the same or similar form.

Figure 4:
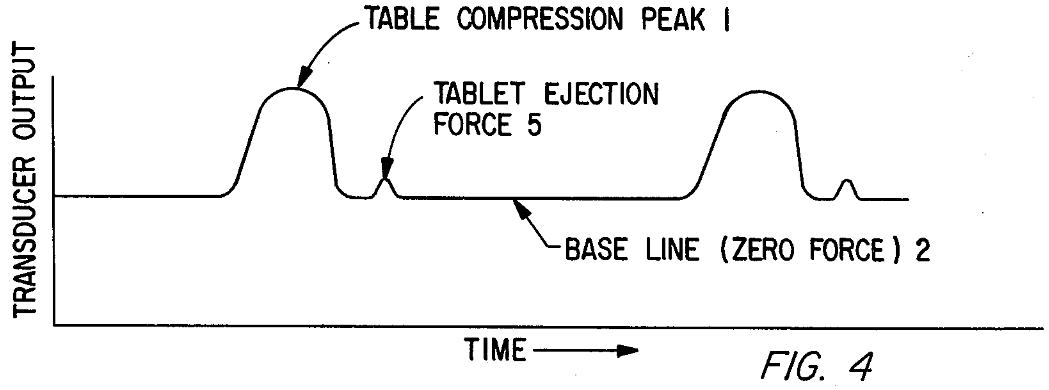
FIG. 4 is a graphic illustration of the output of a force-sensing transducer vs. time for a tablet press with dwell time between tablet compressions and showing in particular the tablet ejection force characteristic (s) of single die-station presses.

Finally, the trace shown in FIG. 4 illustrates yet another typical transducer output versus time profile, this time for a single die-station type of tablet press, in which there also appears dwell time between tablet compression. In this instance, the tablet compression peak is shortly followed by a much smaller transducer output at 5 which represents the tablet ejection force. The portion of the transducer output trace which represents zero force occurs between the tablet ejection force and the tablet compression force trace for the subsequent tabletting event.

The present invention is designed and intended to operate with any one or more of the transducer traces indicated in FIGS. 1 through 4. It will monitor and process tablet compression force, tablet ejection force, and punch withdrawal force, and detect the sharp peaks representative of tablet capping or other compression abnormalities.

Figure 5:
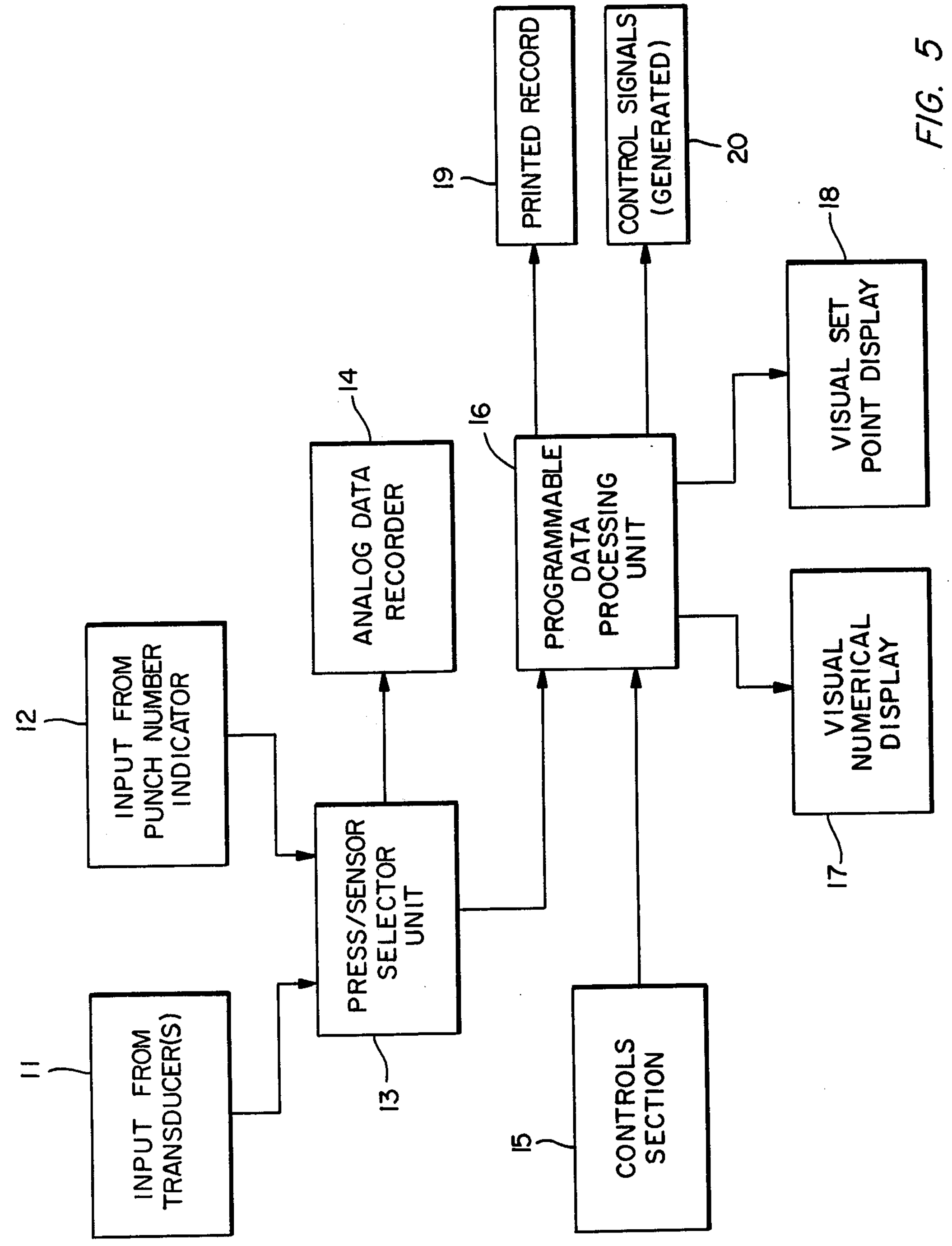
FIG. 5 is a block diagram illustrating a system according to the invention for monitoring and processing inter alia the compression, ejection and punch withdrawal forces developed in and by tablet presses.

A block diagram of a system according to the invention is shown in FIG. 5. The input(s), as represented in block 11, may originate from one or more transducers located on one or more single die-station tablet presses and/or one or more multidie, single or multiple station tablet presses for measuring compression and/or ejection forces. When this invention is used to monitor tablet formation data from multidie, single or multistation tablet presses, it may also receive electrical input data from an indicator means (not particularly shown in FIG. 5) which is associated with each such press and is used to indicate when a specific punch set/die combination is being monitored by the transducer(s). This input is associated with block 12 in FIG. 5. Also, in the case of several presses being monitored, the system provides for selection of the specific press and/or the specific sensor unit(s) from which data are to be processed. A press/sensor selector unit is illustrated in FIG. 5 as block 13. An embodiment of the press/sensor selector unit 13 for selecting the desired transducer(s) and die/punch number indicator will be described later. Of course, it is also well within the scope of this invention to automatically sequence through the input transducer and die/punch indicator signals by the use, for example, of a motor-driven rotary selector switch or other appropriate fixed or programmable selector arrangement.

In some instances, it will be desirable to produce an analog data record of the forces being developed during tabletting. Provision is made to obtain such a recording on, for example, an oscillographic recorder. This recording provision is illustrated in block 14 of FIG. 5. Once the appropriate transducer and die/punch indicator are selected, they are connected via the press/sensor selector unit 13 to a programmable data processing unit shown as block 16 in FIG. 5. The data processing unit 16, which will be described in greater detail hereinafter with reference to FIG. 7, contains a signal input processing section which may be varied according to the type of transducer output versus time signal which is to be processed. It also contains a microprocessor, a random access memory unit(s) and a read-only memory unit (such as an erasable, programmable ROM) which, together with interconnecting logic circuitry, sample the (digitilized) transducer signals and perform thereon the preprogrammed calculations. Additional inputs to the programmable data processing unit 16 are received from a control section shown as block 15 in FIG. 5, which may take the form of a plurality of front panel type controls. Signals from these controls relate to or include, for example, the start and stop switches, the number of compressions and/or ejections which are to be processed for any single set of statistical calculations, signals relative to the printed record, i.e. block 19 of FIG. 5, and actuation of system control signals, i.e. block 20 of FIG. 5.

When used with multidie tablet presses, the so-called "front panel" controls provided in accordance with the invention can also be used to select a specific die/-punch set combination or a specific series of such die/-punch set combinations from which to acquire and tabulate data. For example, if this invention were used with a multidie rotary tablet press which had 41 die/-punch set combinations, it would be possible to collect and use in the calculations data from all 41 during each revolution of the turret. However, during evaluation of tabletting granulations, it may be desirable to record and process data from only one or a selected few of the dies on the tablet press turret. In this way, the influence of variation(s) in tablet punch and die configuration because of, for example, uneven wear, can be isolated and minimized.

The "front panel" controls 15 may also be used to input other data to the programmable data processing unit, such as, the minimum and maximum compression and/or ejection forces which are acceptable for the product being compressed. This facility may, of course, be provided as part of the programmed instructions for the data processing limit, and provided via conventional programming techniques.

The programmable data processing unit 16 performs the predetermined calculations to determine inter alia meaningful statistical quantities, such as the average compression and/or ejection force, the percent standard deviation in compression and/or ejection force, the number of times capping is detected, the number of times a tablet compression or ejection force exceeds or is less than predetermined values, and gradual trends regarding for example compression and/or ejection forces increasing or decreasing in time. Values from these determinations are selectively displayable on a visual (numerical) display unit, comprising, for example, an arrangement of light-emitting diodes, and which is shown as block 17 in FIG. 5.

Since it may be desirable during the actual processing of data to indicate that tablet capping or high or low forces are being developed rather than wait for the entire sequence of calculations to be completed, provision is also made to generate signals to indicate these conditions immediately. These signals may also be fed to a display arrangement comprising for example light-emitting diodes and which is shown in block 18 in FIG. 5, i.e. the visual set point light display.

Provision is made further to acquire a permanent printed record of the calculated results. The printing system is shown as block 19. When the system is being used to monitor data from several presses, the printed record also contains the press number and, where applicable, the press "side" or station from which the data originated.

Moreover, when it is desired, for example, to use over-force, under-force, or capping information data to actuate a press-related control such as a diverter gate (see e.g. FIG. 7), control signals are provided as shown via block 20. The control signals from block 20 are generated and the visual set point display 18 is actuated whenever the appropriate abnormal tabletting condition is sensed rather than at the end of a series of calculations. This involves no more than conventional programming techniques. The control signal circuitry of block 20 and the visual set point display 18, to be described in greater detail hereinafter in connection with FIG. 7, contain individual phase controls and dwell controls to provide means for (a) controlling the time between when an abnormality is sensed and when the control signal is first transmitted and the display first actuated and (b) controlling the duration that the control signal and display are presented.

The preferred embodiment(s) of the various blocks described in connection with FIG. 5 are defined in greater detail in the following.

Figure 6:
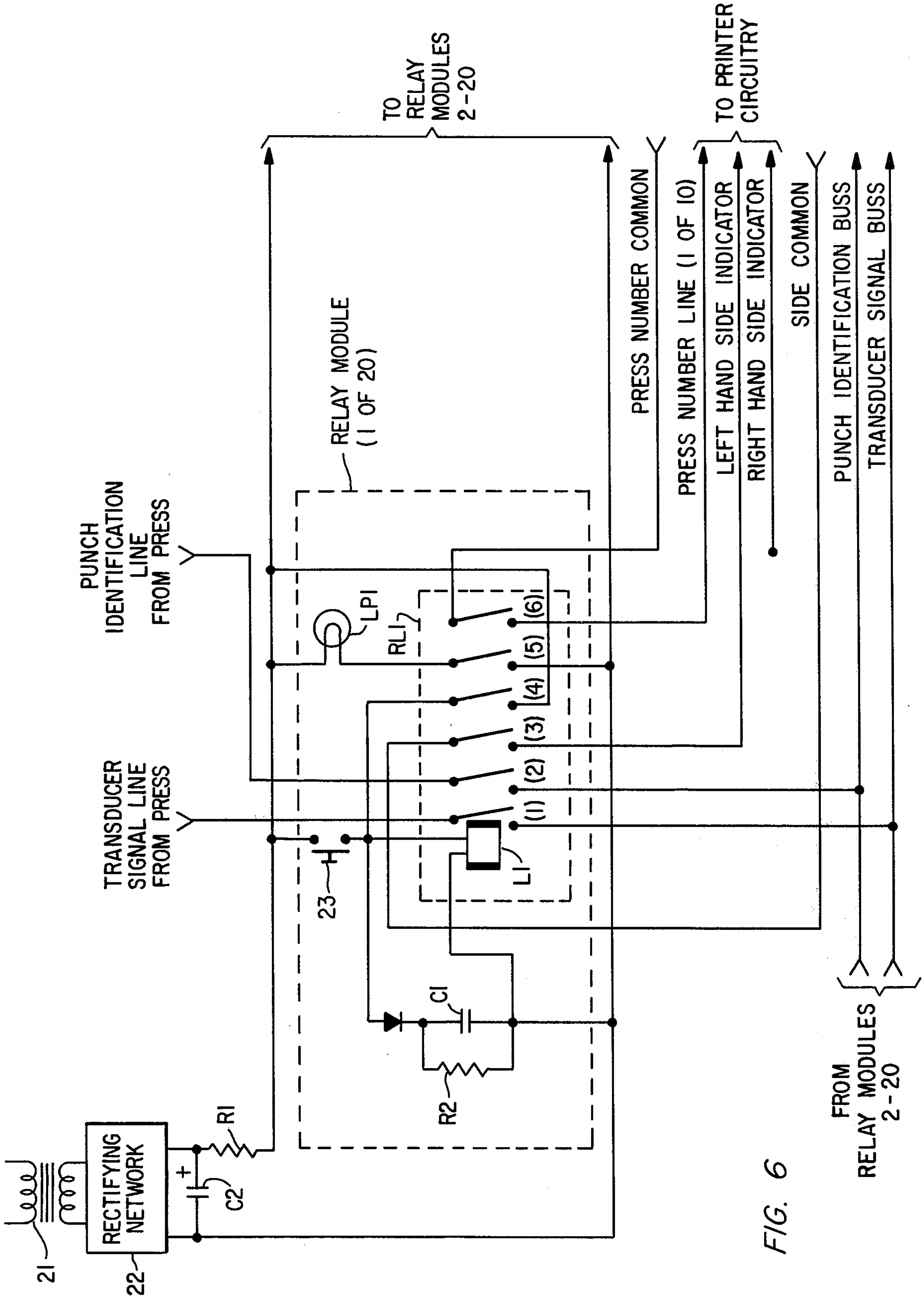
FIG. 6 is a schematic diagram illustrating in detail a portion of the press/sensor unit of FIG. 5.

When several presses or transducers are to be monitored on for example a time-sharing basis, a method and means are needed for switching the outputs from the appropriate transducers (block 11) and punch identification lines (block 12) to the data processing unit 16. This may be accomplished by means of a rotary selector switch, a logic control system, or a series of appropriately connected relay modules. FIG. 6 illustrates an example of the kind of press selector arrangement 13 utilizable in this invention.

Virtually any number of transducers and punch identification lines can be switched using this approach. However, the illustration in FIG. 6 is shown as part of a system arrangement for ten presses, each with two transducer signal lines. The transducers may be either a resistive element type (i.e. strain gage) or the piezo-electric type. In order to achieve simplicity of operation and ease of identifying which press has been selected, the press selector arrangement 13 could of course utilize illuminated push buttons to select and indicate which press is being monitored.

If a strain gage type of transducer is being utilized, it is preferable to amplify the strain gage signal and convert it into a low impedence signal prior to transmitting the signal from the press location to the location of the monitoring and processing system. This minimizes adverse line transmission effects and the effect of finite relay contact resistance on the signal.

The example press selector arrangement herein depicted is configured in such a way that, whenever a press selector switch is closed, all other press selector relays will open and only the relay corresponding to the depressed press selector switch will be actuated. At the same time, the indicator lamp showing which transducer is connected to the electronic processor system would be illuminated. This is accomplished by the circuitry illustrated in FIG. 6.

Electric power for this system is derived from a commerically available transformer 21 and rectifying bridge network 22. To better illustrate the operation of the press selector system, it is assumed that one of the other 19 relay modules have been actuated, and it is desired to open that other relay module and close the relay RI1 of the module shown in FIG. 6. This is done by closing the switch 23. When the pushbutton switch 23 is closed, the capacitor C1, due to the choice of operative value thereof (e.g. 2000 $\mu$f), draws a relatively large amount of current. By virtue of the large current flow through the power supply network, there is a substantial voltage drop across the resistor R1, which typically may have a value of e.g. 150 ohms. This voltage drop reduces the supply voltage to all relay coils, i.e. to the relay coil L1 of each relay module, including the specific module whose switch 23 has been actuated, to a value less than that required to hold the relays in the closed position. As a result, any closed relay opens.

However, after a short period of time capacitor C1 becomes nearly charged and the current draw from the power supply 21, 22 is reduced. As the current flow decreases, the voltage across the relay coil L1 increases to a value sufficient to cause the associated contacts (1)-(6) to close. The pushbutton 23 may then be released and the relay RL1 will remain closed because one of the sets of relay contacts (i.e. contact set [4])supplies voltage to the coil L1. The capacitor C1 then discharges through resistor R2, and in a short time the system is ready for reactivation, if desired. When the relay RL1 is closed, the indicator light LP1 is illuminated (through contact set [5]) indicating which transducer has been selected.

In the example of embodiment shown in FIG. 6, two of the relay contact points are used to indicate respectively: (a) the number of the press which has been selected (i.e. contact set [6]); and (b) the side of the press that has been selected for monitoring (i.e. contact set [3]). These contact closures are used for instance by the printer circuitry (e.g. block 19 of FIG. 5) to print this information. It is assumed in this example that the system is being used to monitor high-speed rotary presses, such as the Manesty Mark II tablet press, which would normally have one transducer installed on each of the two tension bars; one for the right hand side of the press and the other for the left hand side of the press.

Figure 7:
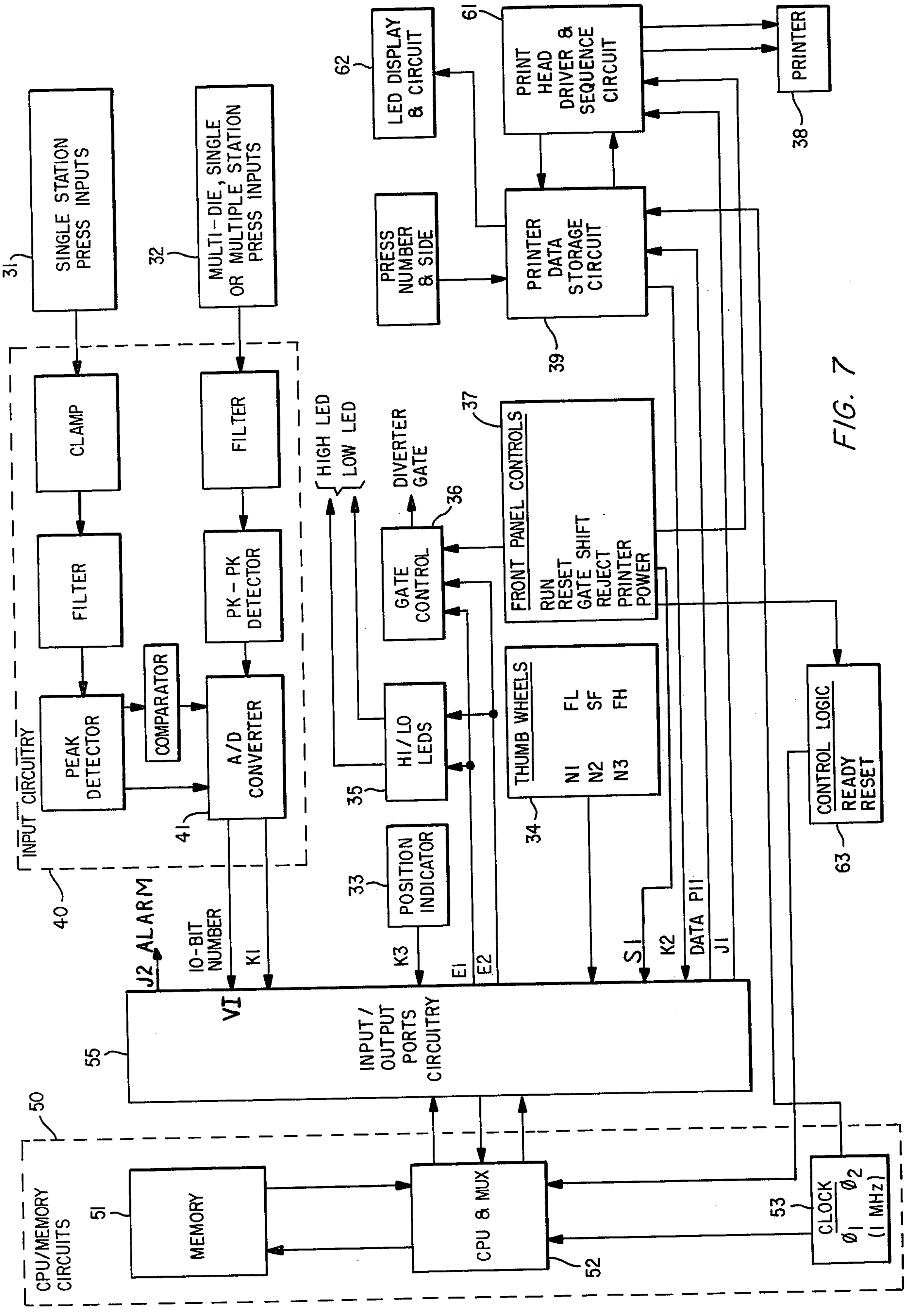
FIG. 7 is a block diagram illustrating the electronic processor arrangement of FIG. 5 according to the invention.

By the arrangement depicted in FIG. 6, the transducer and position indicator signals, associated respectively with contact sets (1) and (2), are then transmitted to the electronic processor arrangement 16, which is shown in detailed block diagram form in FIG. 7. As previously described, the electronic unit: (1) may process data from presses with significant dwell time between the tablet compressions, which are indicated generally as single station press inputs at 31 in FIG. 7, but which, in fact, may involve any of the presses that produce a compression force pattern like that depicted in any of FIGS. 1, 2 or 4; or (2) may process data from presses which have negligible dwell time between tablet formations (i.e. FIG. 3), which are indicated generally as multistation press outputs 32 in FIG. 7. The transducer data are first processed through the input circuitry 40 which detects when a compression (or ejection) maximum is achieved and converts the voltage associated with that maximum to a digital number, for example, by the or similar techniques described in said related U.S. patent applications.

In addition, the analog-to-digital converter 41, included in the input circuitry, also provides a digital status output (K1) which indicates when the (10-bit) digital force number can be sampled by the microprocessor unit 50. The detailed actions or functions of the input circuitry 40 will be discussed later.

The position indicator 33 (relating to block 12 of FIG. 5) can be any suitable position-sensing device, mounted, for example next to the turret of a rotary press in such a way that it can sense the presence of an indicating marker, such as a screw head, which is attached to the turret of the press. The position indicator 33 is arranged to conveniently supply a logic level signal whenever a tablet die, designated e.g. as Tablet Die No. 1, passes next to the sensor device. A suitable device for this application is the Electro Corporation Model 55191, DI-PROX proximity switch. This logic level signal is designated as K3 in FIG. 7.

Additional data are supplied to the input-output ports circuitry 55 through the use of for example thumb-wheel switches indicated as 34 in FIG. 7, which switches may, of course, be mounted on the front of a or the control panel and as such be part of the controls section 15 in FIG. 5. These control panel inputs are designated as N1, N2, N3, SF, FH and FL (FIG. 7).

The product of N1 and N2 represents the total number of force signals which are to be processed for the determination of an average and a standard deviation. In the case of a rotary multidie- station press, N1 represents the number of signals per turret rotation from which to read data. N2 represents the number of revolutions of the turret for which data are to be recorded for a determination of average standard deviation values. N3, for a rotary press, indicates the die number relative to the position indicator mark at which to start recording data. In a production environment where normally all die/punch set combinations would be monitored, N1 would be set to the total number of dies of the press and N2 would be set to the number of revolutions of the turret for each calculation sequence. N3 would probably be set to one. For a single die-station press, N3 would not be used (i.e. would be set to one). However, the product of N1 and N2 would still represent the total number of signals that would be processed in a calculation sequence.

In a product development application on a rotary press, N1 might be set to one so that data from a single die would be sampled and N3 would be set to the number of the die from which data are to be obtained. It is to be clearly understood that it is well within the scope of this invention to provide alternative or additional controls in 34, together with suitable programming of the processor, to enable any combination or number of the dies and/or stations to be monitored, even for separate and different numbers of samplings for each.

SF represents the scaling factor to convert the voltage reading from the force transducer to a force value, and may, in fact, represent one of a number of such switches providing individualized scaling to each press being monitored. The units of this factor would typically be kilograms per volt or pounds per volt. This information, of course, could alternatively be part of the programmed instructions provided to the processing unit via conventional programming techniques.

FH and FL represent limit force values. For example, whenever a force value is higher than FH, an output is activated that may illuminate a visual display such as a light-emitting diode arrangement and activate a control signal. Whenever a force value is less than FL, a different light-emitting diode would be illuminated and the associated control signal also actuated. The logic level output signals to fire the light-emitting diode signal lights and the control signals are shown in FIG. 7 coming from the input-output ports circuitry 55 and E1 and E2 and leading to signal light arrangement 35 and to gate control block 36. The control signals are generated whenever the appropriate abnormal tabletting condition is determined rather than at the end of a series of calculations. The circuitry of the light arrangement 35 and the gate control block 36 respectively contain individual phase controls and dwell controls. The phase controls are provided to govern the time between when an abnormality is sensed and the time of actual generation of the control signal and actuation of the display respectively. The dwell controls are provided to govern the time duration in which the control signal and display are presented. The phase and dwell controls are provided by way of conventional circuit techniques.

The other so-called front panel controls 37 comprise the power control to turn on the power for the entire system, a "run" control to start the microprocessor program, and a reset control to stop the calculation procedure and restart the program being executed by the microprocessor (52) at the selected initial die. In addition, there is provided a switched output control line for activating the hardcopy printer 38 (via driver 61) and an on-off switching arrangement for the control circuitry 36 which is indicated as activating a tablet diverter gate.

It may be assumed here that the gate control circuitry 36 is actuating a diverter gate arranged on or otherwise in connection with the tablet outlet of the tablet press for the purpose of rejecting tablets that fall outside the limits set by the FL and FH (thumb wheel) settings of block 34. In this illustration, therefore, the control signal and diverter gate signal combination refer to a reject mechanism. In addition, the gate shift "front panel" control (of block 37) will enable the operator to determine the position of a diverter gate when the gate control circuitry 36 is not being actuated by signals E1 and E2.

Figure 14:
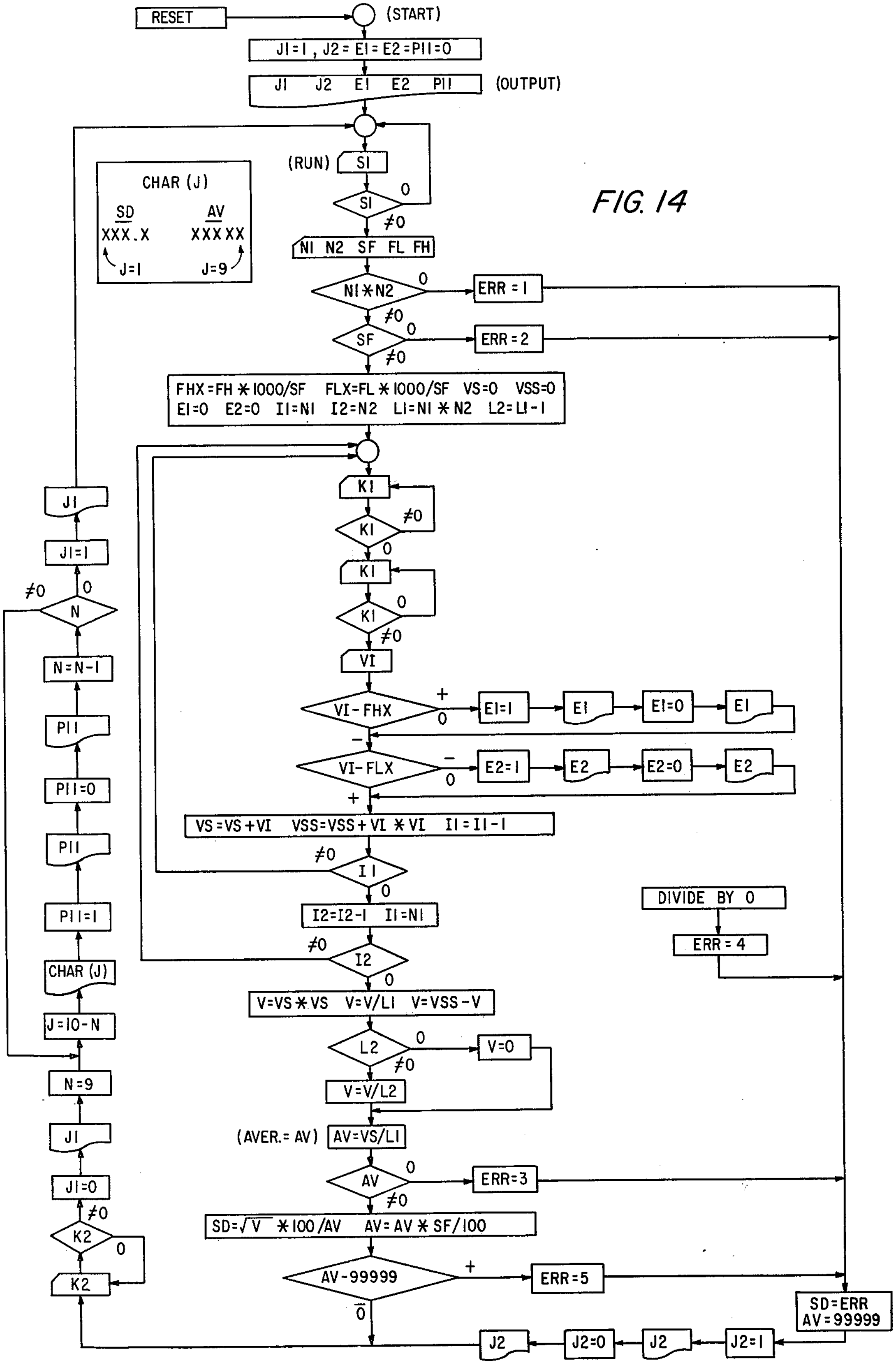
FIG. 14 illustrates a flow chart regarding a data processing sequence providing by way of example the average and standard deviation of compression or ejection tabletting forces, etc.

The input-output ports circuitry 55, central processor unit and multiplexing circuits 52, memory 51 and clock 53 are all state-of-the-art systems based, for example, on the use of an Intel 8080 microprocessor. Intel 1702A PROMs and 2101 RAMs, for example, may be used as the memory in this system. As 1702A PROMs are field-erasable and reprogrammable, this permits program changes at a minimum of cost because it is not necessary to utilize a new memory when a program change is to be made. The programming of the data processing unit comprises conventional programming techniques in effecting the processing of the tabletting information to provide the indicated desired outputs such as the average and standard deviation of compression and/or ejection forces, identification of tabletting abnormalities such as capping, instances of failure to meet Min/Max limits as well as indications of exceeding a standard as regards the number or frequency of bogus tablets produced. Much of the processing requirements and steps are treated in said related patent applications. However, attention is called to FIG. 14 which illustrates in a flow diagram format a typical processing sequence covering for example the derivation of the average and standard deviation and failure to meet Min/Max limits etc. FIG. 14 is exemplary of conventional programming techniques which are employable to enable the data processing means to provide any of the desired processor output herein considered.

The other input-output data to the input-output circuitry 55 consist of communications between the central processing unit 52 and the input-output circuitry 55, and data items J1, K2 and P11. J1 represents a bit which disables the printer 38 while the printer shift register, i.e. the printer data storage circuit 39, is being loaded. P11 represents a strobe which is set high and low after each output character is transmitted to the printer 38. The data consist of BCD characters transmitted to the printer. Finally, K2 is a TTL level signal that indicates when the printer shift register (of 39) can accept BCD output from circuitry 55.

All information sent to the printer 38 from the microprocessor I/O circuitry 55 is displayed on a display arrangement such as a multidigit (e.g. nine-digit) light-emitting diode display 62, and, if the printer switch of 37 has been actuated, is transmitted from the printer storage 39 to the printer driver 61 to produce a hard copy of the calculated results.

The clock circuitry 53 for the microprocessor 52 is set at a frequency of 1 megahertz. For a typical program complexity this allows input signals from the 10-bit A/D converter 41 to be processed at a rate of 200 Hz. This is substantially faster than the tabletting rates achievable with any conventional pharmaceutical tablet press. Again, however, this is merely illustrative of the capability of the invention to handle any tablet press speed.

As previously discussed, the electronic unit depicted in FIG. 7 can process any of the transducer output traces shown in FIGS. 1–4. This can be accomplished for example by making appropriate modifications in the program stored and by making appropriate modifications to the input circuitry 40, such as for example by jumpers or switches.

Figure 8:
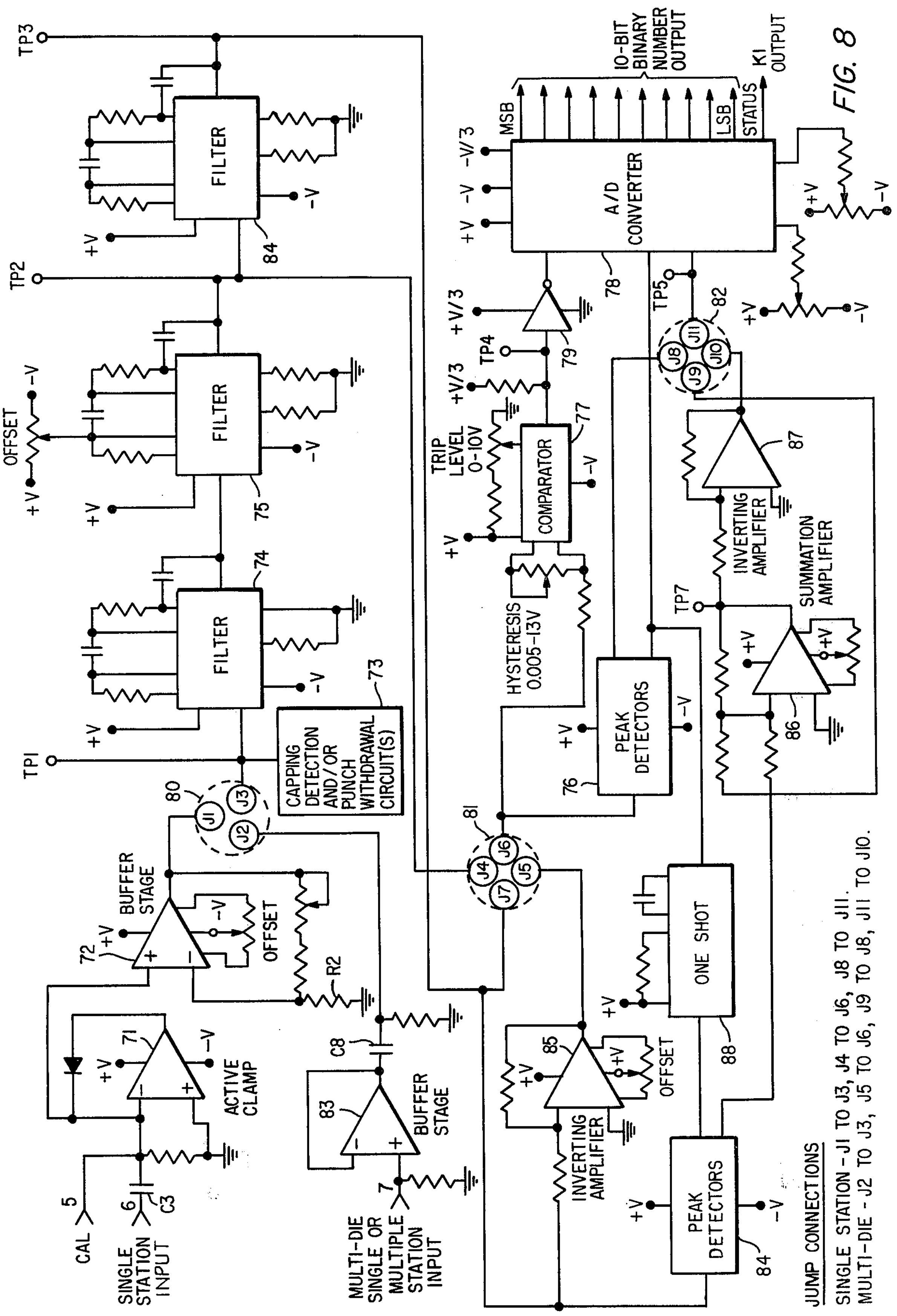
FIG. 8 is a schematic block diagram of an input signal processing circuit arrangement for the input circuitry portion of FIG. 7 in accordance with the invention.
Figures 10A, 10B, 10C, 10D, 10E, 10F, 10G, 10H, 10I:
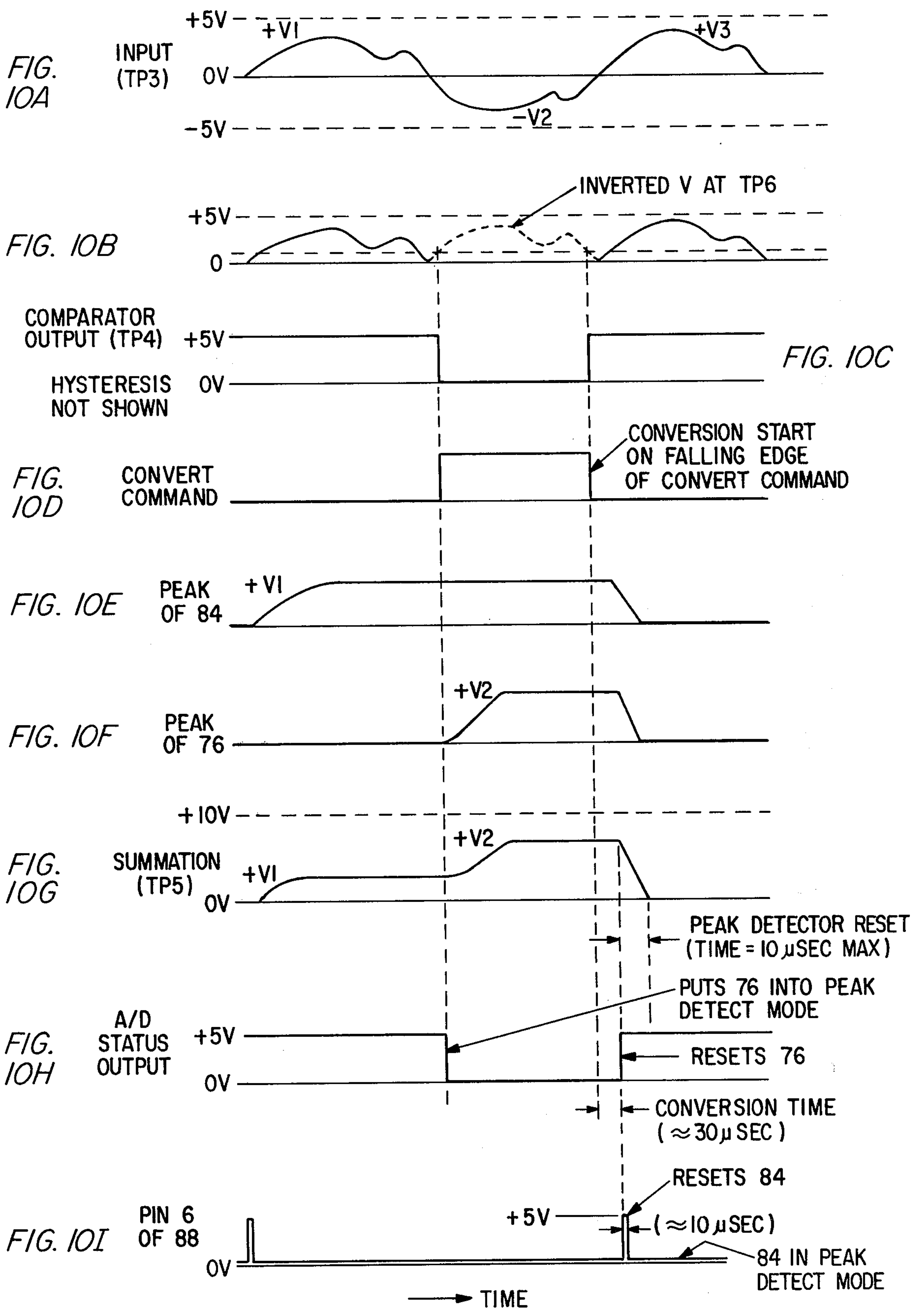
FIGS. 10A–10I graphically illustrate the operation of the circuitry of FIG. 8 when processing a transducer output from a tablet press having negligible dwell time between tablet compressions.
Figure 11:
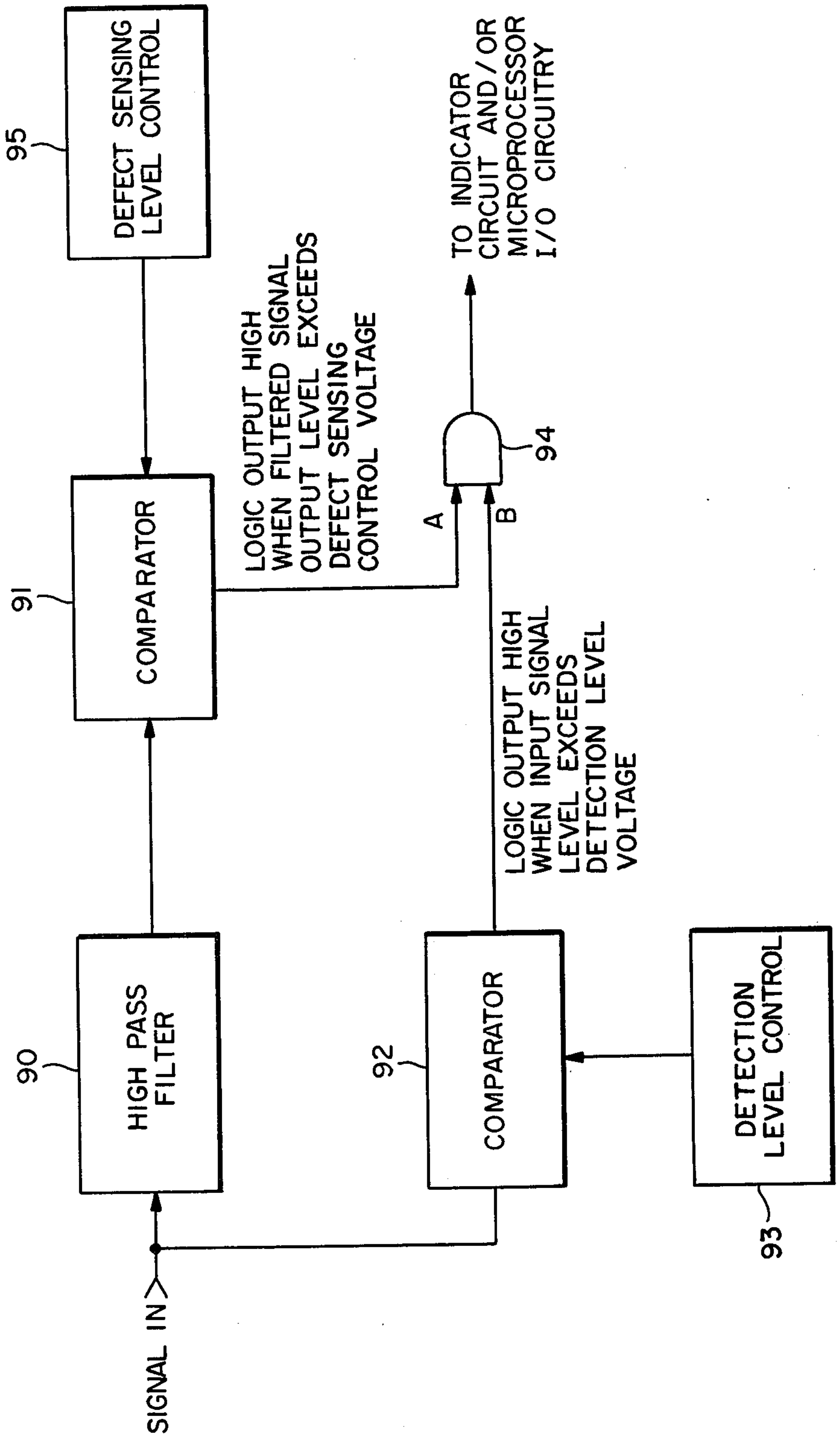
FIG. 11 is a block diagram illustratng a capping detector circuit which may be associated with the circuitry of FIG. 8.

FIG. 8 illustrates a circuit for processing any of the types of signal input traces shown in FIGS. 1–4. In connection therewith, FIG. 9 illustrates the use of the various aspects of FIG. 8 when processing a transducer output from a tablet press with a dwell time between tablet compressions (e. g. a single die-station press input). FIG. 10 illustrates the functions of the various parts of FIG. 8 for processing a transducer output from a tablet press with negligible dwell time between tablet formations. Finally FIGS. 11 and 12 illustrate the capping detection circuit and the punch withdrawal force detector circuit that may be added to the circuitry shown in FIG. 8 to accomplish these functions, and which will be described hereinafter.

When used in connection with the transducer output from a single die-station press, this output is applied at Pin 6 in FIG. 8. The signal is coupled through capacitor C3 to a clamping circuit 71 (such as is incorporated into the commercially available power supply and signal conditioner unit of Model 484/M22 power supply PCB Piezotronics Inc.) which causes the zero force condition to correspond to zero output voltage at Pin J1 following buffer stage 72. In the even that a punch withdrawal force is present or anticipated on the input signal, a punch withdrawal force detector circuit 73 such as that shown in detail in FIG. 12 should be included.

The signal is then passed via a jumper or switch connection 80 and filtered through filters 74 and 75 (which may be for example Burr Brown universal active filters) are supplied to the peak detector 76 (which may be a Burr Brown UAF 31) by means of a jumper or switch connection 81 between terminals J4 and J6 thereof. The signal is simultaneously applied to a comparator 77 (which may be a Burr Brown 4082/03). The purpose of the comparator circuit 77 is to insure that the force level is above some predetermined value before analog-to-digital converter 78 is actuated. This is illustrated in FIG. 9.

Figures 9A, 9B, 9C, 9D, 9E:
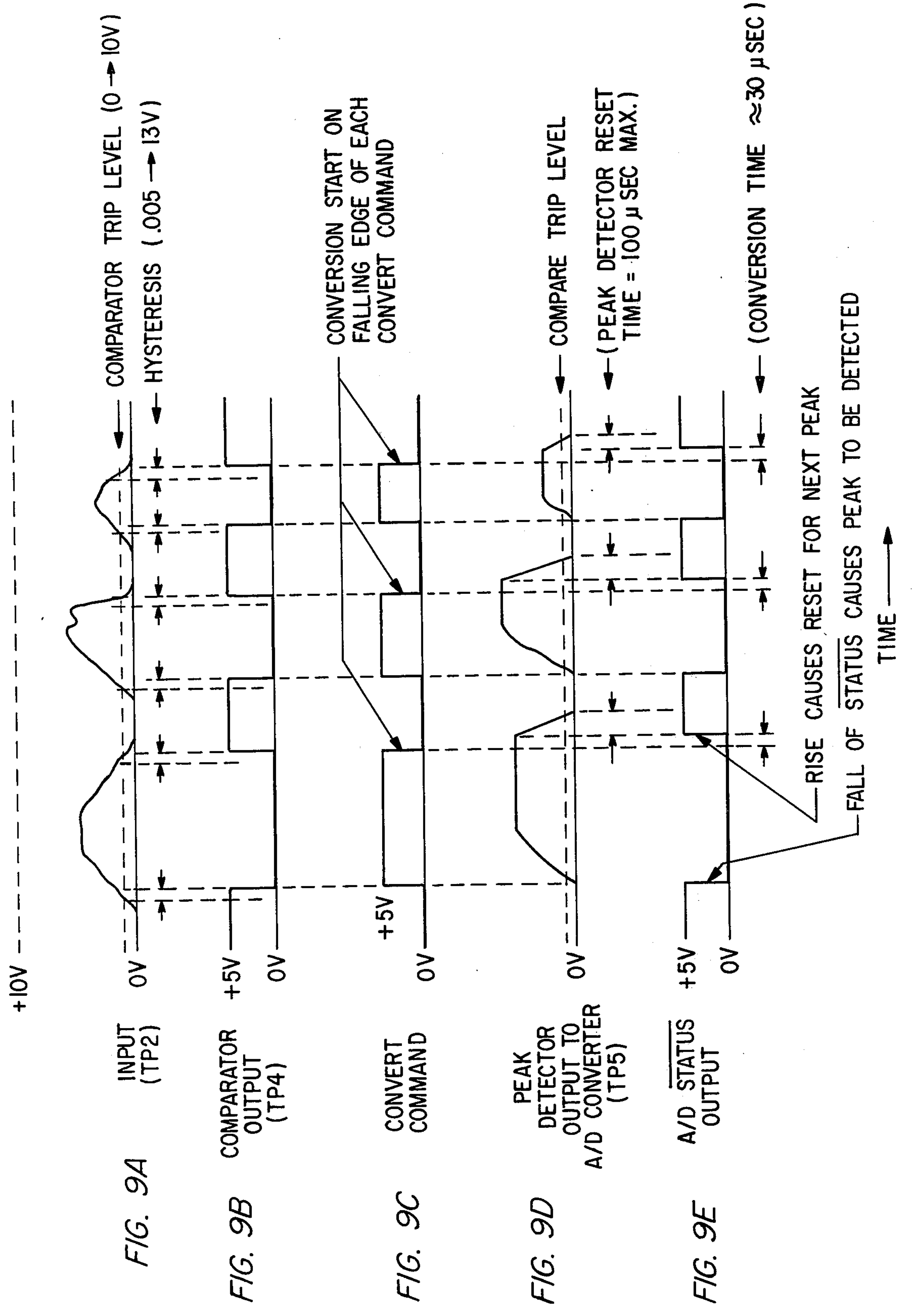
FIGS. 9A–9E graphically illustrate the operation of the circuitry of FIG. 8 when processing a transducer output from a tablet press having dwell time between tablet compressions.

FIG. 9A shows a series of typical tabletting force traces, and FIG. 9B shows the logic level output from the comparator 77 as measured at (test point) TP4. It can be seen that the comparator output is low whenever the compression force exceeds some preset value and remains low until the voltage associated with the compression force falls below the comparator trip level less the hysteresis voltage. The comparator output voltage is then inverted by inverter 79 (FIG. 8) and sent to the convert command input terminal (FIG. 9C) of the A/D converter 78. At this time the peak detector 76 has stored on its output (which may be measured at [test point] TP5) the maximum voltage sensed during the compression cycle (see FIG. 9D). The analog-to-digital conversion then takes place and, when it is completed, the rise on the status line (FIG. 9E) from the analog-to-digital converter 78 causes the peak detector 76 to be reset for sensing the next peak.

Identical circuitry can be used for a transducer output trace such as that shown in FIG. 1 or for a transducer output trace which includes a tablet ejection force such as that shown in FIG. 4, because both the compression and ejection force peaks can be detected. Discrimination between compression and ejection peaks is easily accomplished for example by analysis of the force levels using the program in the microprocessor memories.

For presses where there is negligible dwell time between compression or ejection cycles, which is typical of high-speed multistation presses, the transducer signal is input at Pin 7 of the circuit shown in FIG. 8. The signal is then fed through operational amplifier 83, which acts as a buffer, and the nonpolarized capacitor C8. A jumper wire connecting J2 with Pin J3 connects the signals to filters 74, 75 and 84. The filtered signal as it would appear at (test point) TP3 is shown in FIG. 10A. The signal is then set to peak detector 84. It is also sent to peak detector 76 through the inverting system 85. The inverted signal available at (test point) TP6 is illustrated in FIG. 10B as a dashed line. Again, the comparator 77 is used to control when the conversion is to take place. The comparator output conversion commands (from amplifier 79) are shown in FIGS. 10C and 10D. The output of peak detectors 76 and 84 shown in FIGS. 10E and 10F is summed up by the network comprising stages 76–78 and 84–87 and the total voltage shown in FIG. 10G is applied to the A/D converter 78. As before,the status output from the A/D converter 78 is used to reset the peak-to-peak detectors 84 and 76 (the latter via one shot 88). This is illustrated in the timing diagrams shown in FIGS. 10H and 10I.

FIG. 11 shows additional circuitry provided to the input circuitry of FIG. 8 to detect tablet capping. Since tablet capping is usually accompanied by a relatively high frequency or short duration pulse(s) or component(s) during the compression cycle, capping may be detected by passing the developed signal through a high-pass filter 90, as shown in FIG. 11, and comparing the filtered signal voltage with a known voltage by use of a comparator 91, which may take the form of a Burr Brown 4082/03 unit.

In order to control the absolute force level at which the tablet is tested for capping, the input signal is also fed to and tested against a known voltage at comparator 92, which also could be a 4082/03 unit. By using the detection level voltage control 93, the input signal level at which logic input B to the "AND" gate 94 goes high can be controlled. Input A to "AND" gate 94 goes high whenever the filtered signal output of state 90 exceeds the sensing level voltage which is controlled by defect sensing level control 95, the latter involving a preset threshold. By appropriately adjusting voltage controls 93 and 95, the output from the "AND" gate 94 will go high only when tablet capping, or other formation abnormality which produces a high frequency transducer signal, is present. The output from "AND" gate 94 may then be connected to the same indicator and control circuitry that is used with the E1 and E2 high and low force signals as shown in FIG. 7. In addition, the output from 94 may be sent to the microprocessor I/O circuitry 55 for processing.

If a negative compression or punch withdrawal force is present on the transducer signal, as illustrated in FIG. 2, it is desirable to determine the amount of this force. A circuit arrangement for accomplishing this is shown in FIG. 12. A representative signal is shown in FIG. **13*a*. When the compression peak is detected, the peak detector status line 102*a* goes low and this triggers delay one shot 103. The delay one shot output feeds a sample hold module 105 as a "sample-when-high" command and also A/D converter 106** as a conversion start on a "high-to-low-transition" command. The delay time is adjustable to account for differences in tablet formation rate so that the baseline is sampled when there is no tablet formation force. Since the signal had previously been clamped so that the maximum punch withdrawal force corresponded to zero input voltage, the baseline voltage level indicates the magnitude of punch withdrawal force.

After the data conversion is complete, the high level on the status line resets the peak detector 102 for the next signal. These data are also sent to the I/O circuitry along with the digital output from the A/D converter 106. These data can then be read to the microprocessor system. It should be noted that this circuit is the only one that involves timing adjustment for different press speeds.

A highly significant feature of this invention is that sampling of input by the microprocessor system need be done only once or twice for each tablet formation. The portion of the signal processing system comprising the input circuitry selects the correct voltages to be supplied to the I/O circuitry (FIG. 7). This is in contrast to a system where the signal must be sampled many times during the trace and the processor must select appropriate values on which to perform subsequent processing. With the instant system, the A/D converter may be slower, less expensive unit and the computer speed and memory size (and therefore cost) may also be less than with a system requiring the sampling of many data points during each compression and ejection.

It should be observed that two or more input circuitry arrangements can be used in the same processing unit, allowing the simultaneous processing of compression and ejection forces that may require different input lines and input circuitry processing schemes. It is necessary to have provided only a sufficient number of input ports in the I/O system and have correctly programmed the microprocessor system.

The following represent additional or amplified practical applications of the disclosed invention. The system can readily be made (programmed) to provide sequencing from one of the several or many presses to be monitored to the next, in place of or in addition to a manual or operator-selected sequence of individual press monitoring.

All "sides" (where applicable) of all the presses as well as all die and/or punch sets (also where applicable) may be monitored virtually simultaneously via a sufficiently fast time-sharing and/or multiplexing technique associated with or in lieu of block 13 of FIG. 5, as providing the inputs to the processing unit 16.

One is able, by this invention to monitor and/or analyze virtually any combination or sequence of press dies, punch sets and stations (or sides) in the monitoring and analysis of the presses themselves. For example, in product development applications, even where data from only one die/punch set combination of a multidie press may be desired on occasion, this invention provides: (1) means for sequencing each punch set/die combination of each multidie, single or multiple station press, wherein for instance one might wish to analyze punch set/die combination No. 1 for perhaps 10 consecutive turret rotations, followed by punch set/die combination No. 2 being monitored for the next ten turret rotations, and so on. This could be varied to take virtually any order of punch set/die combinations and for any desired number of samplings (e.g. No. 10 puunch set/die combination for ten turret rotations, followed by No. 2 punch set/die combination for 25 turret rotations etc.). And, of course, the operator might desire, and would via this invention be rewarded with, information from the monitoring of several different punch set/dies of the same press on each turret rotation (e.g. the operator may wish to receive data from punch set/die combination No.'s 1, 5, 8, 9, 12 etc.) for the next 25 turret rotations of that particular press. Of course, the same or similar types of analysis or monitoring may be carried out for any number of presses connected into the system, and in any order.

Although FIG. 8 is representative of one practical version or example of the input circuitry 40 of FIG. 7, and in FIG. 8 the conversion from single die press monitoring to multidie press monitoring is indicated as being accomplished (purely for convenience of illustration) via jumpers, it is to be clearly understood that the circuitry of FIG. 8 is exemplary of any suitable circuitry arrangement which provides the system with a capability for monitoring either or both, and virtually simultaneously or in desired sequence, the single die and multidie type presses. In fact, it is well within the scope of this invention to provide in place of the jumpers illustrated in FIG. 8 one or more electronic switching arrangements having direct switching control from the processor as suitably programmed therefor. Moreover, a plurality of the input circuit arrangement may be provided, at least one of which is intended to handle inputs only from single die presses (and would correspondingly be "jumped" or connected for such operation) and at least one other of which is intended to handle inputs only from multidie presses (and would likewise be suitably connected for such operation).

Alternatively the plurality of input circuit arrangements, such as that of FIG. 8, could be arranged such that one or more such arrangements are intended to handle inputs from those kinds of presses having a substantial dwell time between compressions (FIGS. 1, 2 and 4) and at least one other FIG. 8 type circuit intended to handle all the presses having negligible dwell time betweeen compressions (FIG. 3). Thus, by this invention a central operator is able to monitor and derive data from virtually any combination of inputs from any combination of tablet presses.

It might also be noted that conversion of a FIG. 8 type circuitry arrangement from a FIG. 3 type operation to a FIGS. 1, 2 and 4 operation can either be solely via programming-control signals or via one or more operator-controlled logic arrangements. Also, as the technique employed with regard to multidie presses (FIG. 10) includes "folding over" of the negative-going portions, it is well within the scope of this invention to employ this foldover type technique to the types of presses and inputs depicted in FIGS. 1, 2 and 4 for purposes of processing the incoming information. The impact of this is that the input circuitry requirement would be somewhat lessened.

It is to be noted further, that the waveforms of FIGS. 1 and 3, for example, could also be representative of ejection force, where the sensing transducer is coupled to an ejection cam (e.g. FIG. 3) or some other ejection force-transmitting element of the press. With this in mind, the arrangement of more than one input circuitry arrangement could take the form of employing one such arrangement for monitoring the compression forces from all the presses and the other for monitoring of the ejection forces from these presses.

To be also understood is the fact that the "gate control" 36 of FIG..7 has associated therewith both phase and duration control ("phase" being how long the waiting period is before the alarm is fired, and "duration" being how long the alarm is fired). This gate control signal, it is to be recognized, may be utilized for any of a number of applications beside just a gate diverter tablet reject means.

The versatility of this invention is such that it is also well within the scope of this invention to provide (e.g. in the processor logic) for identification of the condition of when too many bogus readings are obtained over a cerrtain number of tablets produced (this would be preset); this information can be utilized to provide a control signal for actuating a special alarm, such as for shutting down the press unit altogether.

By this invention one is also provided with the capability of having the capping detector circuitry (FIG. 11) output(s) utilized, for example, for the purposes of counting the number of "caps" or rejecting (similar to the above) on the basis of the number of caps (the caps/tablet production ratio) or the capping frequency. Likewise, the discussion of the above paragraph is intended to include "rejection" based on the frequency of bogus readings.

It is, moreover, to be clearly understood that wherever reference is made to "capping" in the above, the same is intended to include any other abnormality which would result in high frequency components in, riding on or otherwise part of the waveform during the peak compression portion(s) thereof.

In the use of the instrumentation herein disclosed for purposes of granulation (formulation) evaluation, one way, in accordance with the invention first select a particular tablet die/punch set combination of a tablet press for the evaluation and proceed to have the information obtained therefrom processed. A second and different type of press tabletting the same formulation may also be selected for information processing and the processed information obtained from the two presses compared. Moreover, the first-selected press, and more particularly the same tablet die/punch set combination of that press, can be selected for evaluation of a second formulation. The results of the first and second tabletted formulations on the same die/punch set combination of the same tablet press may then be compared for example with regard to superior tabletting characteristics. Furthermore, the operator can make on that same first-selected press, after running successive trials on a plurality of different or varied formulations, another run of the initially-tabletted formulation to gain a measure of verification of the intermediate evaluations. By way of the identification means associated with each tablet press, one is always assured of correct selection of information from the same die/punch set combination.

What is claimed is:

1. Instrumentation for use in connection with tablet presses having at least one tablet die and an associated punch set, such as high-speed rotary tablet presses, comprising:

a. first means operatively connected with a tablet press for obtaining tablet formation information representative of one or more tabletting events from any tablet die/punch set combination of said press and for identifying said tablet die/punch set combination;

b. second means connected to said first means for converting the tablet formation information into a convenient first data form; and c. data processing means connected to said second means for processing in a pre-established manner said tablet formation information in said first data form and providing output signals representative thereof, including, where appropriate, tablet press control signals, said data processing means including third means for selectively making available for processing tablet formation information from a desired one or more of the tablet press die/punch set combinations.

2. Instrumentation according to claim 1 wherein said second means includes peak detection means for operating on said tablet formation information from said first means and analog-to-digital converting means connected to said peak detection means.

3. Instrumentation according to claim 2 wherein said first means includes means for providing from said tablet press a substantially continuous stream of tablet formation force information in the form of a series of tabletting cycles having negligible dwell period representations between tablet formation representations and said second means includes peak-to-peak detection means operating on the information stream provided by said first means.

4. Instrumentation according to claim 2 wherein said first means includes means for providing from said press a substantially continuous stream of tablet formation force information in the form of a series of tabletting cycles having dwell period representations occurring between tablet formation representatives, and wherein said second means includes clamping means connected between said third means and said peak detection means for causing the dwell period representations to correspond to a reference signal level and comparator means connected between said peak detection means and said analog-to-digital converting means for controlling the actuation of said analog-to-digital converting means in response to the relationship of the output of said peak detection means to a pre-established value.

5. Instrumentation according to claim 2 wherein said analog-to-digital converting means includes fourth means for providing to said data processing means a first control signal for controlling the receipt by said data processing means of the digital data signal output of said analog-to-digital converting means.

6. Instrumentation according to claim 1 wherein said data processing means includes fifth means for providing at least one output representative of the peak compression force and/or peak ejection force of the selected tabletting event(s).

7. Instrumentation according to claim 1 wherein said data processing means includes sixth means for providing at least at first output signal and further including tablet rejection means responsive to said first output signal for causing one or more tablets formed by the tablet press to be rejected.

8. Instrumentation according to claim 7 wherein said tablet rejection means includes at least one diverter gate arranged on the tablet press and gate control means operatively connected between said diverter gate and said data processing means for causing said diverter gate to be actuated in response to said first output signal.

9. Instrumentation according to claim 7 further including first display means connected to said data processing means for immediately displaying an indication of the condition giving rise to tablet rejection in response to said first output signal.

10. Instrumentation according to claim 1 wherein said data processing means includes seventh means for providing a second output signal for deactivating said tablet press.

11. Instrumentation according to claim 1 wherein said data processing means includes eighth means for detecting relatively high frequency components associated with one or more of the compression force portions of the selected tablet formation information which components are representative of abnormal tablet formation such as tablet capping.

12. Instrumentation according to claim 7 wherein said tablet rejection means includes phase control means for providing an adjustable time period between the generation of said first output signal and the effectuation of the rejection of said one or more tablets in response thereto.

13. Instrumentation according to claim 12 wherein said tablet rejection means further includes duration control means for adjustably establishing the length of the period during which tablet rejection is effected.

14. Instrumentation according to claim 1 wherein said data processing means includes ninth means for pre-establishing criteria defining non-acceptable tablet formation information and tenth means for determining whenever the frequency of occurrence of non-acceptable tablet formation information exceeds a pre-established threshold and for providing in response thereto a third output signal.

15. Instrumentation according to claim 1 wherein said data processing means includes ninth means for pre-establishing criteria defining non-acceptable tablet force information, and eleventh means for determining whenever the number of occurrences of non-acceptable tablet formation information reaches a pre-established value and for providing in response thereto a fourth output signal.

16. Instrumentation according to claim 1 wherein said second means includes first input circuitry means operatively connected to said tablet press and arranged to operate on compression force portions of the tablet formation information and second input circuitry means operatively connected to said tablet press and arranged to operate on ejection force portions of the tablet formation information.

17. Instrumentation according to claim 1 wherein, in the case of said tablet press being a multidie-station tablet press, said second means includes a separate input circuitry means operatively connected to the tablet formation information output from a respective one of each of the tabletting stations of said tablet press.

18. Instrumentation according to claim 1 wherein said tablet press is a multidie tablet press and wherein said data processing means includes means for selectively making available for processing tablet formation information in said first data form from only a single tablet die/punch set combination of said multidie press.

19. Instrumentation according to claim 1 wherein said tablet press is a multidie-station tablet press and wherein said third means includes means for selectively making available for processing tablet formation information in said first data form from only one station of said multidie-station press.

20. Instrumentation according to claim 1 wherein said tablet press is a multidie tablet press and said data processing means includes means for sequentially making available for processing tablet formation information in said first data form from each tablet die/punch set combination of the tablet press in a predetermined order.

21. Instrumentation according to claim 1 wherein said tablet press is a multidie tablet press and wherein said data processing means includes twelfth means for selectively making available for processing the tablet formation information in said first data form from one or more die/punch set combinations of the tablet press for a predetermined number of consecutive tabletting events for each such tablet die/punch set combination.

22. Instrumentation according to claim 21 wherein said twelfth means includes means for pre-establishing an individual number of consecutive tabletting events for each selected tablet die/punch set combination.

23. Instrumentation according to claim 1 wherein said tablet press is a multidie tablet press and wherein said data processing means includes means for selectively making available for processing tablet formation information in said first data form predetermined ones of said tablet die/punch set combinations in a pre-established order and for a predetermined number of consecutive tabletting events for each of such tablet die/punch set combinations.

24. Instrumentation according to claim 1 further including means for automatically adjusting the data acquisition speed relative to the rate of tablet formation of the table press.

25. Instrumentation according to claim 7 wherein said sixth means includes means for determining from, and with regard to each tabletting event represented by, the tablet formation information in said first data form made available by said third means whether the tablet formed by each such tabletting event comes within pre-established limits of a first criteria.

26. Instrumentation according to claim 1 wherein said tablet formation information includes tabletting compression force and ejection force information, and further including means for monitoring and processing force information generated in connection with the withdrawal of the tablet punches from their respective tablet dies following the peak compression force portions of tabletting events.

27. Instrumentation according to claim 21 wherein in cases in which said instrumentation is utilized for granulation evaluation, said data processing means includes means for automatically eliminating from the tablet formation information received in said first data form individual portions thereof obtained from any tablet die/punch set combination which is determined by said data processing means to be mechanically faulty.

28. Instrumentation according to claim 1 wherein said first means includes means for providing an analog voltage signal output representative of the tabletting forces developed during tabletting, including compression and ejection forces, and further including means for sampling said analog voltage signal at predetermined intervals during such tabletting cycle and thereby virtually completely characterize the developed compression and ejection forces and means for varying the sampling rate relative to the tabletting rate of the press.

29. A system for selective monitoring of a plurality of tablet presses, of the types having one or more tablet dies and associated punch sets and one or more tabletting stations, and for processing tablet formation information obtained therefrom, comprising:

a. first means associated with each such tablet press for obtaining tablet formation information representative of tabletting events relating to any tablet die/punch set combination of such press;

b. second means associated with each such press for providing signals identifying each tablet die/punch set combination thereof;

c. third means, connected to said first and second means associated with each such press, for selecting individual ones of said plurality of presses to be monitored and thereby the tablet formation information to be processed; and d. data processing means connected to said second and third means for processing tablet formation information from the tablet presses selected by said third means and for producing output signals representative of said information, including, where appropriate, tablet press control signals.

30. A system according to claim 29 wherein said third means includes means for selecting a particular one of the stations of a multi-station tablet press.

31. A system according to claim 30 further including recording means and wherein said third means further includes means for causing the selected tablet formation information to be recorded on said recording means, including information as to which tablet presses, and, if appropriate, which tabletting station(s) thereof are selected.

32. A system according to claim 29 wherein said data processing means includes means responsive to the input from said second and third means for effecting the processing of tablet formation information from only a selected one tablet die/punch set combination of a desired tablet press.

33. A system according to claim 29 wherein said first means comprises at least one force transducer mounted on each such tablet press, and wherein said at least one force transducer is arranged to provide tabletting compression and ejection force information.

34. A system according to claim 29 wherein said third means includes means for monitoring said tablet presses on a time-sharing basis.

35. A system according to claim 29 further including fourth means connected between said third means and said data processing means for converting the selected tablet formation information into a convenient first data form.

36. A system according to claim 35 wherein said fourth means includes first input circuit means operatively associated to the ones of said plurality of tablet presses constituting single die-station tablet presses, second input circuit means operatively associated with the ones of said plurality of tablet presses constituting multidie, single station tablet presses, and third input circuit means operatively associated to the ones of said plurality of tablet presses constituting multidie-station tablet presses, wherein each of said first, second and third input means provides said conversion of the selected tablet formation information.

37. A system according to claim 35 wherein said fourth means includes first input circuit means operatively associated to the ones of said plurality of tablet presses constituting high-speed tablet presses and second input circuit means operatively associated with the remainder of said plurality of tablet presses, for converting the selected tablet formation information to said first data form.

38. A system according to claim 35 wherein said fourth means includes first input circuit means operatively associated with the ones of said plurality of tablet presses providing an output of said first means having dwell time between successive tabletting event representations and second input circuit means operatively associated with the ones of said plurality of tablet presses providing an output of said first means having negligible dwell time beween successive tabletting event representations, for converting the selected tablet formation information to said first data form.

39. A system according to claim 35 wherein said fourth means includes first input circuit means for converting the compression force portions of the selected tablet formation information from said plurality of tablet presses into said first data form and second input circuit means for converting the ejection force portions of the selected tablet formation information from said plurality of tablet presses into said first data form.

40. A system according to claim 29 wherein said data processing means includes means for evaluating the tablet represented by the selected tablet formation information in terms of tabletting forces developed during tablet formation, and further including means for sorting said tablets based on the tabletting forces associated therewith satisfying predetermined tabletting force criteria.

41. A system according to claim 29 wherein said third means includes means for automatically sequencing the selection of said plurality of tablet presses.

* * * * *

UNITED STATES PATENT OFFICE
CERTIFICATE OF CORRECTION

PATENT NO. 4,030,868

DATED June 21, 1977

INVENTOR(S) Joseph James Williams

It is certified that error appears in the above-identified patent and that said Letters Patent are hereby corrected as shown below:

Column 19, line 51, insert --tablet-- after "more".

Column 20, line 2, "table" should read "tablet".

Column 21, line 26, "with" should read "to".

Column 22, line 27, "tablet" (first occurrence) should read "tablets".

Signed and Sealed this

*Twenty-fourth* Day of *October 1978*

[SEAL]

*Attest:*

RUTH C. MASON
*Attesting Officer*

DONALD W. BANNER
*Commissioner of Patents and Trademarks*